United States Patent [19]  
Lupton et al.

[11] Patent Number: 4,983,299  
[45] Date of Patent: Jan. 8, 1991

[54] REMOVAL OF PHENOLS FROM WASTE WATER BY A FIXED BED REACTOR

[75] Inventors: F. S. Lupton, Evanston; Denise M. Zupancic, Bensenville, both of Ill.

[73] Assignee: Allied-Signal, Morris Township, Morris County, N.J.

[21] Appl. No.: 335,610

[22] Filed: Apr. 10, 1989

[51] Int. Cl.$^5$ ............................................. C02F 3/10
[52] U.S. Cl. ................................. 210/617; 210/631; 210/150; 210/909
[58] Field of Search ....................... 210/615–618, 210/610, 611, 620, 631, 150, 151, 908, 909; 432/176, 182

[56] References Cited

U.S. PATENT DOCUMENTS 4,165,281  8/1971  Kuriyama et al. ............... 210/616
4,415,454 11/1983  Fuchs .................................... 210/616
4,469,600  9/1984  Frydman et al. ............. 210/617 X
4,479,876 10/1984  Fuchs ............................. 210/616 X
4,566,971  1/1986  Reimann et al. ................. 210/616

Primary Examiner—Tom Wyse  
Attorney, Agent, or Firm—D. L. Webster; G. H. Fuchs; R. C. Stewart

[57] ABSTRACT

A porous biomass support system in a fixed bed reactor configuration affords biodegradation of phenolic materials to a level under 20 parts per billion at an hydraulic residence time of about 15 hours with significantly less sludge formation currently possible by available methods. The porous biomass support system utilizes an open-celled foam within which is entrapped small particles of porous activated carbon and suitable microorganisms. The carbon is self-regenerative and does not have to be periodically replaced or replenished. The entire porous biomass support system can operate for extended periods of time without replacement.

20 Claims, No Drawings

REMOVAL OF PHENOLS FROM WASTE WATER BY A FIXED BED REACTOR

FIELD OF THE INVENTION

This invention is directed toward aerobic biodegradation of organic pollutants in aqueous media using a type of porous biomass support system as a fixed bed, with particular emphasis on phenolic materials as organic pollutants.

BACKGROUND OF THE INVENTION

One of the hallmarks of contemporary civilization is that each increment of technological progress almost invariably is accompanied by a similar increment of environmental regress. As the pace of technological advances quickens so does the march of environmental deterioration. The realization of environmental damage has occurred only relatively recently, so that present society sometimes finds itself burdened with the accumulated sins of the not-too-distant past. But another hallmark of current society is its acceptance of the undesirability of environmental degradation coupled with a determination to minimize and even reverse it wherever possible. Although the return of ground waters to their pristine condition of an earlier era is not a realistic goal, there is a genuine determination to make our waters as pure as possible. Environmental agencies have set limits for many common industrial pollutants, and as methods of pollution reduction have become more successful in reducing or removing pollutants from waste water, environmental regulations have become more stringent, resulting in an ever tightening spiral whose goal is to reduce pollutants in waste water to that minimum which is technologically feasible.

Among the methods employed to reduce or remove pollutants, bioremediation constitutes an effective and highly desirable approach. Quite broadly in bioremediation pollutants serve as a food source, generally as a source of carbon and/or nitrogen, for microorganisms. Bacterial metabolism converts the pollutants to metabolites generally with a simple chemical structure, sometimes degrading the pollutants completely to carbon dioxide and water in an aerobic process, or to methane in an anaerobic process. But in any event the metabolites usually have no adverse environmental effects.

Phenol itself, and phenolic compounds as a generic class, is a commonly employed industrial chemical used by many industries, such as resin manufacturers. Phenols also are a product of delignification and are formed in large quantities in wood pulping processes. This application has as its particular focus removal of phenolic compounds, such as phenol, cresols, catechols, resorcinol, nitrophenols, and halogenated phenols, from waste water. However, discussion within will emphasize the suitability of the process which is our invention to a broad class of organic materials, including aromatic hydrocarbons and polynuclear aromatic hydrocarbons.

Bioremediation has been successfully and extensively used to reduce phenol levels, most commonly effecting phenol biodegradation using activated sludge in storage retention ponds. Phenols at high concentration are toxic to microorganisms, and addition of adsorbents such as Fuller's earth and activated carbon to a retention pond appears to prevent phenols at toxic concentrations from interfering with bacterial activities, or at least to reduce such interference; see U.S. Pat. Nos. 3,904,518 and 4,069,148. Despite its wide commercial acceptance this method has various disadvantageous consequences whose elimination would be welcome. Degradation of phenolics occurs slowly, with degradation time depending, inter alia, on the phenol concentration in the initial waste stream, but a holding time of 10-20 days is not unusual. In turn this requires very large storage basins, which means large land masses are dedicated to phenol degradation. Especially in urban areas, removal of scarce land masses from industrial development and other uses is difficult if not impossible. Phenol degradation by activated sludge also is attended by continued replication of the microorganisms leading to further sludge formation which needs to be continually removed from the retention basins and sludge disposal itself is a significant cost factor in phenolics removal from waste waters. Additionally, the activated carbon needs to be periodically replaced and/or regenerated, adding to the overall process cost both via its replacement as well as the disposal of spent carbon.

The aforementioned disadvantages have led others to seek bioremediation methods employing a higher biomass concentration than found in retention ponds. In particular, beds containing microorganisms "attached" to the support have been used in both aerobic and anaerobic degradation of phenol, with and without the presence of activated carbon. Despite the limited success which has been experienced, none of the prior art methods have matured into a commercially successful process. In contrast, we have found a means of using a porous biomass support system which overcomes many limitations of the prior art and which has great commercial potential.

The invention described within is applicable to the biodegradation of large classes of organic pollutants, nonetheless an important focus of our efforts is the removal of phenol and other phenolic materials from waste water. For the purpose of clarity in exposition and conciseness what follows usually will be couched in terms of phenol removal. However, at all times it is to be understood that phenol is but one phenolic compound, and phenolic materials are but representative of organic polluting components which can be removed by our invention. Consequently the invention is to be given far broader scope than merely the removal of phenolic materials.

As befits the current emphasis on environmental cleanup, a vast amount of research has been directed toward the removal of phenol. The following review is not intended to be exhaustive but rather discusses some representative pertinent art. Both U.S. Pat. Nos. 3,904,518 and 4,069,148 describe the addition of activated carbon or Fuller's earth to a suspension of biologically active solids (activated sludge) in waste water as an aid in phenol removal. The adsorbents presumably act by preventing pollutants toxic to the bacteria from interfering with bacterial metabolic activity. The patentees' approach has matured into the so-called PACT process which has gained commercial acceptance despite its requisites of a long residence time, copious sludge formation with attendant sludge disposal problems, and the need to regenerate and replace spent carbon.

Rehm and coworkers have further refined the use of activated carbon in the aerobic oxidation of phenolic materials by using microorganisms immobilized on granular carbon as a porous biomass support system. Utilizing the propensity of microorganisms to grow on and remain attached to a surface, Rehm used a granular activated carbon support of high surface area (1300 m$^2$/g) to which cells attached within its macropores and on its surface, as a porous biomass support system in a loop reactor for phenol removal. H. M. Ehrhardt and H. J. Rehm, *Appl. Microbiol. Biotechnol.*, 21 32-6 (1985). The resulting "immobilized" cells exhibited phenol tolerance up to a level in the feed of about 15 grams per liter, whereas free cells showed a tolerance not more than 1.5 g/L. It was postulated that the activated carbon operated like a "buffer and depot" in protecting the immobilized microorganisms by absorbing toxic phenol concentrations and setting low quantities of the absorbed phenol free for gradual biodegradation. This work was somewhat refined using a mixed culture immobilized on activated carbon (A. Morsen and H. J. Rehm, *Appl. Microbiol. Biotechnol.*, 26, 283-8 (1987)) where the investigators noted that a considerable amount of microorganisms had "grown out" into the aqueous medium, i.e., there was substantial sludge formation in their system.

Suidan and coworkers have done considerable research on the analogous anaerobic degradation of phenol using a packed bed of microorganisms attached to granular carbon (Y. T. Wang, M. T. Suidan and B. E. Rittman, *Journal Water Pollut. Control Fed.*, 58, 227-33 (1986)). For example, using granular activated carbon of 16×20 mesh as a support medium for microorganisms in an expanded bed configuration, and with feed containing from 358-1432 mg phenol/L, effluent phenol levels of about 0.06 mg/L (60 ppb) were obtained at a hydraulic residence time (HRT) of about 24 hours. Somewhat later, a berlsaddle-packed bed and expanded bed granular activated carbon anaerobic reactor in series were used to show a high conversion of COD to methane, virtually all of which occurred in the expanded bed reactor; P. Fox, M. T. Suidan, and J. T. Pfeffer, ibid., 60, 86-92 (1988). The refractory nature of ortho- and meta-cresols toward degradation also was noted.

Givens and Sack, 42nd Purdue University Industrial Waste Conference Proceedings, pp. 93-102 (1987), performed an extensive evaluation of a carbon impregnated polyurethane foam as a microbial support system for the aerobic removal of pollutants, including phenol. Porous polyurethane foam internally impregnated with activated carbon and having microorganisms attached externally was used in an activated sludge reactor, analogous to the Captor and Linpor processes which differ only in the absence of foam-entrapped carbon. The process was attended by substantial sludge formation and without any beneficial effect of carbon.

The Captor process itself utilizes porous polyurethane foam pads to provide a large external surface for microbial growth in an aeration tank for biological waste water treatment. The work described above is the Captor process modified by the presence of carbon entrapped within the foam. A two-year pilot plant evaluation of the Captor process itself showed substantial sludge formation with significantly lower microbial density than had been claimed. J. A. Heidman, R. C. Brenner, and H. J. Shah, *J. of Environmental Engineering.* 114, 1077-96 (1988). A point to be noted, as will be revisited below, is that the Captor process is essentially an aerated sludge reactor where the pads are retained in an aeration tank by screens in the effluent line. Excess sludge needs to be continually removed by removing a portion of the pads via a conveyor and passing the pads through pressure rollers to squeeze out the solids.

H. Bettmann and H. J. Rehm, *Appl. Microbiol. Biotechnol.*, 22, 389-393 (1985) have employed a fluidized bed bioreactor for the successful continuous aerobic degradation of phenol at a hydraulic residence time of about 15 hours using *Pseudomonas putida* entrapped in a polyacrylamide-hydrazide gel. The use of microorganisms entrapped within polyurethane foams in aerobic oxidation of phenol in shake flasks also has been reported; A. M. Anselmo et al., *Biotechnology B. L.*, 7, 889-894 (1985). The latter appears to be the sole report of microorganisms entrapped within a foam used for biodegradation of organic pollutants.

An industrially desirable method of removing phenolic materials from waste waters would have the following characteristics. The method would be (1) an aerobic oxidation achieving (2) effluent phenol levels less than 0.1 parts per million (ppm) at (3) hydraulic residence times under 24 hours requiring (4) no activated carbon regeneration or replacement and with (5) substantially less sludge formation than obtained from currently available technology. None of the aforementioned art achieves all of the above, nor does the art give any indication how such a goal can be achieved. We have found that if both powdered activated carbon and phenol-degrading aerobic microorganisms are entrapped within an open-celled polyurethane foam which is then used as a porous biomass support system in a fixed bed reactor, each of the foregoing goals are readily attained. Levels of effluent phenol down to at least 20 parts per billion can be attained at an HRT of under about 16 hours. Carbon is not physically lost from the reactor, thus avoiding the need for replacement, and is self-regenerative within the reactor. Sludge formation is minimal; comparative tests with other fixed bed reactors show that our immobilized cell bioreactor (ICB) produces less than 25 percent the amount of sludge formed by presently commercially viable systems. In short, as measured by its performance characteristics our invention is a marked improvement over the prior art; relative to the prior art our invention represents a difference in kind rather than a difference in degree.

Reduced sludge formation attending our process is neither an incidental nor a minor benefit. A major result of increased wastewater treatment is an ever increasing quantity of sludge, which presents a serious disposal problem because of increasingly restrictive policies on dumping or spreading untreated sludge on land and at sea. The cost of sludge disposal today may be severalfold greater than the sum of other operating costs of wastewater treatment. Accordingly, the reduction in sludge levels characteristic of our invention has immediate, substantial economic benefit and alleviates the pressures of sludge dumping.

SUMMARY OF THE INVENTION

A purpose of this invention is the removal of organic pollutants, especially phenolic materials, from aqueous waste streams to achieve EPA-mandated levels of under 20 parts per billion phenol in no more than 30 hours. An embodiment comprises flowing an aqueous stream containing the phenolic materials in the presence of oxygen through a fixed mass of a porous biomass support system of particulate open-celled polyurethane foam having both powdered activated carbon and aerobic phenolic degrading microorganisms entrapped within its pores. In a more specific embodiment the porous biomass support system is an open-celled polyurethane containing from 5 to 50% activated carbon on a dry weight basis at the time of its preparation. In a more specific embodiment the porous biomass support system has from about 20 to about 40% activated carbon, 70% of which is no more than 44 microns in size.

DESCRIPTION OF THE INVENTION

Increasing pressure on the removal of organic pollutants from aqueous streams has emphasized the need and desirability of using high biomass concentration to achieve biodegradation in the minimum possible time while meeting the low effluent levels set by the Environmental Protection Agency and at a cost comparable to existing technology. We have achieved these goals by using a unique porous biomass system (PBSS) in a fixed bed configuration, where the PBSS is an open-celled foam having entrapped within its pores both powdered activated carbon and viable aerobic pollutant-degrading microorganisms. As a working hypothesis it is postulated that the activated carbon concentrates pollutants on its surface. If the carbon were macroporous with pores of a size to accommodate the microorganisms, and if carbon were of a small particle size with a high surface area, we reasoned that the proximity of microorganisms to the locally high concentration of adsorbed pollutant would result in their faster and more complete degradation. This would afford lower effluent pollutant levels while "protecting" microorganisms from the toxic effects of pollutants. The "immobilization" of bacteria and carbon within the pores of the foam prevents the physical loss of carbon and tends to minimize sludge formation, that is, growth of the microorganisms into the aqueous feed. The PBSS in a fixed bed reactor then provides the high concentration of biomass permitting a relatively low hydraulic retention time.

Stated somewhat differently, at levels above 1-5 ppm microorganisms utilize phenol rapidly because of the high binding constants between the microorganisms and phenol, but at levels under 1 ppm utilization is slow and phenol utilization is a lengthy process. The carbon in our PBSS concentrates phenol in the vicinity of microorganisms; the local concentration of phenol as seen by the microorganisms is very high, leading to higher rates of phenol utilization.

The porous biomass support system of our invention is unique in the way it combines foam, carbon, and microorganisms. The invention as described more fully within combines the aforementioned porous biomass support system in a fixed bed operation to afford low phenol effluent levels at a low hydraulic residence time and with significantly less sludge formation than previously attainable. The invention thus affords advantages of considerable industrial merit not previously attainable by currently available systems.

The organic pollutants which may be degraded by the use of our invention include phenolic material as a major class. Members of this class include phenol itself, the cresols, resorcinol, catechol, halogenated phenols such as 2-chlorophenol, 3-chlorophenol, 4-chlorophenol, 2,4-dichlorophenol, pentachlorophenol, nitrophenols as 2-nitrophenol and 4-nitrophenol and 2,4-dimethylphenol. Another important class of organic pollutants consists of aromatic hydrocarbons, such as benzene, toluene, the xylenes, ethylbenzene, and so forth. Polynuclear aromatic hydrocarbons are an important subclass as represented by naphthalene, anthracene, chrysene, acenaphthylene, acenaphthene, phenanthrene, fluorene, fluoranthene, naphthacene, and pyrene. More generally, the method within can be applied to streams containing organic pollutants without limitations, so long as they are capable of being degraded by aerobic microorganisms.

The pollutants which are to be biodegraded in the practice of this invention typically are found in aqueous waste streams at industrial manufacturing facilities. For example, phenol is found in waste streams of phenol manufacturers, of phenol users as phenol resin producers, of coal tar processing facilities, of wood pulping plants and other facilities practicing delignification. This is not to say that the process can or must be practiced only on such streams. The process which is the invention herein may be practiced on any aqueous feed containing levels of organic pollutants which are to be reduced and which may be greater than that permitted by the environmental protection agency.

The key to our invention is the passage of an aqueous feedstock under oxygen rich conditions through a fixed bed reactor of a particular porous biomass support system. The PBSS which is the core of our invention has 3 elements; an open-celled foam, powdered activated carbon entrapped within the foam, and viable, aerobic, pollutant-degrading microorganisms also entrapped within the interior of the foam. The presence of both powdered activated carbon and microorganisms within the foam constitute an important distinction from any prior art PBSS. Incorporation of powdered activated carbon within the foam prevents its physical loss in fixed bed reactor operation, obviating the need for periodic replacement or replenishment of carbon, and also facilitates its bioregeneration. The entrapment of microorganisms within the foam, especially in close proximity to the powdered activated carbon, is responsible in part for the low sludge formation accompanying the practice of this invention, and also is responsible in part for the low residual levels of pollutants in the effluent, reasons for which have been stated above in the discussion of our working hypothesis of this invention.

The foam used in the practice of this invention is a particulate open-celled foam to accommodate feed flow in the fixed bed configuration. That is, it is important for the pollutant-containing aqueous feed to flow through the interior of the foam. For the same reason it is desired that the foam has high macroporosity; foam voids desirably are at least 2 millimeters, and preferably are on the order of 5-6 millimeters in size. The foam also needs to be resistant to the shear forces and abrasion present in a fixed bed reactor, and should have good crush strength. The foam is desirably semiflexible, with a density of under about 2 pounds per cubic foot for optimum economic feasibility. However, higher density foams, of 4-5 pounds per cubic foot or even higher, are usable. It needs to be realized that foam density is related to the economics of the invention and not to its performance; the invention may be practiced with a large range of foam density, even if certain ranges may present distinct economic advantages. The chemical nature of the foam is a relatively unimportant aspect of our invention, so long as the foam is open-celled with void characteristics as described above, is suitable for use in a fixed bed reactor over extended times, and can be prepared in the presence of appropriate microorganisms without being lethal. To date polyurethanes appear to be the foam of choice.

The foam is prepared in the presence of a suspension of powdered activated carbon and aerobic, pollutant-degrading microorganisms so as to entrap both of the latter within the interior of the foam. When prepared the PBSS contains at least 5 weight percent, and up to about 85 weight percent, preferably not greater than 50 weight percent, of activated carbon on a dry basis. When activated carbon is present at a level under about 5% its effectiveness is reduced to a point where the resulting PBSS is only marginally advantageous. At levels above about 50 weight percent incorporation of activated carbon the foam becomes fragile, losing its structural integrity and becoming easily physically damaged. Most often the PBSS when prepared contains at least about 10 weight percent activated carbon, and usually contains from about 20 up to about 40 weight percent porous activated carbon.

The powdered activated carbon has a surface area at least about 500 $m^2/g$, preferably at least about 700 square meters per gram, and is of a size such that at least 70% of the carbon particles are smaller than about 44 microns, that is, a minimum of 70% pass through a 325 mesh sieve. The powdered activated carbon has as high a pore volume as is practical, at least 0.5 cc/g, typically at least 0.7 cc/g, with as great a porosity as possible contributed by pores of greater than 1 micron size. Maximization of the macropores maximizes the concentration of microorganisms in the immediate proximity of the activated carbon surface. Typical powdered activated carbons used in the practice of this invention have a surface area 700-1000 $m^2/g$, a pore volume 0.7-1.0 cc/g, with 70-100% of the particles under 44 microns in size. Although these correspond to characteristics of commercially available material, our invention per se imposes no such limitations. In particular, high surface area carbons, bons, even up to 1500-2000 $m^2/g$, with as high a pore volume as possible are quite desirable for us in our process.

The microorganisms which are used in the practice of this invention are aerobic microorganisms selected to degrade the pollutants of interest in ways well known to those in the art. Thus, cultures isolated from the pollutant-containing waste streams themselves usually are enriched and subsequently incorporated into the PBSS. It needs to be emphasized that there is nothing critical in the particular microorganisms used, and methods for their selection are broadly known.

The PBSS generally is prepared by forming the foam in the presence of a suspension of powdered activated carbon and suitable microorganisms. Thus, for example, a suitable polyurethane foam precursor can be mixed with an aqueous suspension of powdered activated carbon and aerobic pollutant-degraded microorganisms, often in the presence of blowing or foaming agents such as carbon dioxide or surfactants, generally with vigorous mixing at the beginning of polymerization followed by quiescence to permit good void formation. The foam as produced is then cut into an appropriate particle size and loaded as a fixed bed into a reator. The pollutant-containing aqueous feed is pumped through the fixed bed, generally in an upflow configuration. It is important that the fixed bed reactor be aerated to provide the necessary oxygen-rich environment for proper microbial metabolism and pollutant degradation. Oxygen generally is incorporated along with the feed at the bottom of the reactor, when the reactor is run in an upflow configuration, so as to afford an aqueous stream saturated, or nearly saturated, in oxygen. A minimum dissolved oxygen level of at least 2 mg/L is desirable, and an oxygen level of 5 mg/L or higher is preferable.

The pollutant-containing aqueous feed with dissolved oxygen is then passed through the fixed bed of the PBSS. An hydraulic residence time of under about 30 hours, generally less than about 24 hours, and usually no more than about 15 hours, suffices to attain an effluent phenol level of under 0.1 parts per million, usually under 20 parts per billion. The particular hydraulic residence time depends upon the amount of phenolic materials in the feedstock, operating temperature, the presence of other materials in the feedstock, the density of microorganisms in the fixed bed, and so forth. The low hydraulic residence time is a consequence of both the particular PBSS used and the fixed bed configuration. The low phenol level in the effluent is a consequence of the presence of activated carbon in the particular configuration of the PBSS used. The low sludge level is a consequence of the particular PBSS in a fixed bed configuration.

The pH of the pollutant-containing feed may need to be adjusted for optimum biodegradation. Nutrients, and especially phosphate and ammonium salts, may need to be provided, but sufficient amounts often are present in the aqueous feed to satisfy miniumum requirements of the microorganism.

The PBSS of our invention can be used over extended periods of time without replacement or maintenance of any type. It is anticipated that in most cases the initial charge may be used for at least one year and up to perhaps five years before replacement becomes necessary. Throughout this time the reactor should operate with significantly less sludge formation than that from currently available systems, affording important advantages in sludge disposal cost. A comparison of representative levels of sludge production in several biological treatment systems is summarized in the following table, where sludge production is measured per unit reduction of COD (chemical oxygen demand).

| System | SLUDGE PRODUCTION IN BIOLOGICAL TREATMENT SYSTEMS Sludge Production (kg dry wt sludge/ metric ton COD consumed) |
|---|---|
| Aerobic activated sludge | 400–600 (a) |
| Anaerobic digester | 20–150 (a) |
| Sybron biotower | 200–300 (b) |
| This invention | 30–100 (b) |

(a) R. E. Speece, "Anaerobic Biotechnology for Industrial Wastewater Treatment", Environmental Science and Technology, Vol. 17, p 416A–427A, 1983
(b) Experimental results; cf. Example III In practice, the method of our invention can reduce phenol levels to under 0.1 ppm, and generally to under 20 ppb, with sludge formation of no more than 100 kg dry weight sludge, often only 30 kg dry weight sludge, per metric ton total chemical oxygen demand consumed.

The following examples are merely illustrative and representative of our invention which is of considerably larger scope. These examples should not be considered limiting in any way.

EXAMPLE I

Preparation of the Porous Biomass Support System.

A. Preparation of bacterial culture.

To prepare bacterial inoculum adapted to the waste stream that is to be treated, enrichment cultures were set up by adding to samples of the waste stream 100 mg/L ammonium sulfate and 25 mg/L of sodium phosphate followed by adjustment of the pH to 7.0. One hundred mL portions of the foregoing sample were dispensed into 250 mL flasks and inoculated with soil or sludge, then incubated at 25° C. on a rotary shaker (250 rpm) for 7 days. At this time 1 mL subcultures were dispensed into new wastewater samples and incubated for another 7 days. Cultures were then maintained under these conditions prior to foam manufacture.

B. Foam Preparation.

The polyurethane used to manufacture the biofoam was a toluene diisocyanate polyether prepolymer supplied by W. R. Grace under the trade name Hypol. Foaming occurs upon reaction with water, and the pore structure of the foam can be altered by the addition of surfactants as well as auxiliary blowing agents such as chlorofluorocarbons or exogenous carbon dioxide to afford interconntected pores of at least 2 millimeter size. The following procedure is typical.

Five gallons (50 lbs) of polyurethane prepolymer (HYPOL 2000) was added to a mixing vessel of approximately 100 gallons capacity. Twenty-five pounds of activated carbon (Calgon PAC type WPX), 2 mL of Tween 80 surfactant, and 20 grams of sodium bicarbonate were mixed with the HYPOL 2000 to make a homogenous prepolymer/carbon/additive mixture using a high torque mechanical mixer. A homogenous mixture is indicated when the material has a wet "sheen" appearance. Two mL of Tween 80 and 10 mL of glacial acetic acid were added to 5 gals. of bacterial culture (optical density at 600 nm approx. 0.2). The bacterial culture then was added to the polyurethane prepolymer/carbon mixture in the mixing vessel and mixed rapidly with the high torque mechanical mixer. At first, the mixture was very viscous but rapidly lost its viscosity and was easily mixed. As the degree of crosslinking increased, the material once again began to become viscous. At this stage it is very important to stop mechanically mixing the solution and allow the foaming to proceed. The sodium bicarbonate and the glacial acetic acid neutralize each other and in the process generate exogenous carbon dioxide. This extra gas formation added with that generated from the HYPOL crosslinking reactions leads to large and interconnected pores in the biofoam. The presence of the Tween 80 amplifies this effect by decreasing interfacial surface tension and promoting foam formation. The foam was usually allowed to cure for 10 to 20 minutes before it was cut up into blocks or shredded in a fitzmill comminuting machine to produce biofoam blocks of the desired size. The total volume of biofoam produced from this quantity of prepolymer and bacterial culture and produced under the above conditions was between 80 and 100 gallons.

EXAMPLE II

Preparation, Operation, and Performance Characteristics of Fixed Bed Reactors.

Four glass reactors were used as fixed bed reactors with different packing material as described in table 1. Fixed bed reactors using a bed of biofoam of this invention is referred to as an immoblilized cell bioreactor (ICB). Each bench scale fixed bed reactor consisted of a glass column of approximately 580 ml total capacity 64 cm high and 3.4 cm internal diameter. The reactor volume occupied by water and foam was approximately 480 ml. The biofoam in the reactors consisted of irregular ⅜" cubic blocks with the bed held in the reactor by means of 1/14" wire mesh screens 53 cm apart. Biofoam volume in the reactor was approximately 350 ml with an internal void volume of 260 ml. The interstitial water volume between the biofoam blocks was approximately 130 ml. Reactors were operated in a cocurrent upflow mode, i.e., both air and water flowing from the bottom to the top of the reactor, unless otherwise indicated. Compressed air (40 psig) was used to aerate the column through a sintered glass sparger located at the bottom of the column. A gas regulator was used to regulate the aeration rate through the sparger at a level between 4 and 12 L/hr. Wastewater was pumped from a 4 liter feed reservoir to the bottom of the reactor with a Masterflex peristaltic pump. Typical wastewater flows through the reactor ranged from 0.25 to 0.8 ml/min. The effluent from the columns was collected in another 4 liter reservoir. Both the feed and effluent reservoirs were placed in ice baths. The ambient temperature of the columns was approximately 25° C.

| Reactor | Packing/Catalyst | Flowpath |
|---|---|---|
| #1 | Polypropylene discs, cells allowed to colonize surface (natural biofilm developed). | Upflow |
| #2 | P-1 cells[a] entrapped in polyurethane foam (5 g of HYPOL 3000 with 100 mL of P-1 culture | Upflow |
| #3 | P-1 in foam with ativated carbon (5 g of HYPOL 3000 25 g of ATOCHEM 830 DC[b] and 100 mL of P-1 culture). | Upflow |
| #4 | P-1 in foam with activated carbon as for #3. | Downflow |

[a]Yeast cells enriched as described in Example I from hydrocarbon contaminated soil sample from Des Plaines, IL.
[b]Powdered activated carbon from Atochem Co.

In each case the feed consisted of an aqueous solution containing 0.1 g/L dibasic potassium phosphate, 0.5 g/L ammonium sulfate, 0.1 g/L magnesium sulfate, 0.05 g/L calcium chloride, 0.01 g/L yeast extract, and 500 mg/L phenol. The phenol present in the effluent from the columns was analyzed by solid phase extraction with cyclohexyl columns supplied by Analytichem Co. by the 4-aminoantipyrine assay (R. D. Yang and A. E. Humphrey, *Biotech. and Bioeng.*, 17, 1211-35 (1975)). Suspended solids in the reactor effluents were determined by measuring the optical density at 600 nm. The columns were operated at a liquid hourly space velocity between 0.03 and 0.12 hrs$^{-1}$ for a total period of 116 days at an aeration rate (air introduced at bottom of reactor) of 12 liters per hour and an average temperature of 25° C. Results are tabulated in the following tables.

The results in Tables 2-4 will be better appreciated if it is understood that both the particular microbial species present in the reactors and their population are varying through the course of experimentation. With time the microorganisms adapt to the waste stream via natural selection, and the adaptation itself may depend, *inter alia*, on flow rate (LHSV). The population of any species also may vary with flow rate, and the changing population mix and number means that a steady state may not have been achieved at all flow rates during the course of experimentation. In fact, since low flow rates were chronologically the earliest experiments it is unlikely that a steady state was achieved at an LHSV of 0.03 hr$^{-1}$ during the period of sampling. The chief consequence is that comparisons among reactors at any one LHSV are significant, but comparisons, even within the same reactor, of results at different LHSV are ambiguous.

TABLE 2

Effluent Phenol Concentrations in Immobilized Whole Cell Reactors

| LHSV$^a$, | Effluent Phenol Concentration (μg/L) | | | |
|---|---|---|---|---|
| hr$^{-1}$ | Reactor #1 | Reactor #2 | Reactor #3 | Reactor #4 |
| 0.03 | 73 ± 31 | 72 ± 40 | 31 ± 21 | 31 ± 11 |
| 0.06 | 44 ± 9 | 45 ± 8 | 24 ± 12 | 29 ± 13 |
| 0.09 | 40 ± 16 | 33 ± 4 | 18 ± 6 | $b$ |
| 0.12 | 23 ± 8 | 24 ± 3 | 12 ± 5 | $b$ |

$^a$LHSV = liquid hourly space velocity. Hydraulic retention time (HRT) and LHSV are reciprocals, I.E., HRT = (1/LHSV)
$^b$Reactor #4 plugged

TABLE 3

Effluent Suspended Solids in Immobilized Whole Cell Reactors

| LHSV$^a$ | Suspended Solids as O.D. 600 nm | | | |
|---|---|---|---|---|
| hr$^{-1}$ | Reactor #1 | Reactor #2 | Reactor #3 | Reactor #4 |
| 0.03 | 0.190 ± 0.060 | 0.030 ± 0.015 | 0.046 ± 0.020 | 0.021 ± 0.010 |
| 0.06 | 0.102 ± 0.064 | 0.062 ± 0.012 | 0.029 ± 0.020 | 0.022 ± 0.020 |
| 0.09 | 0.064 ± 0.041 | 0.052 ± 0.041 | 0.040 ± 0.012 | $b$ |
| 0.012 | 0.106 ± 0.091 | 0.048 ± 0.018 | 0.073 ± 0.034 | $b$ |

$^a$LHSV = liquid hourly space velocity. Hydraulic retention time (HRT) and LHSV are reciprocals, i.e., HRT = (1/LHSV)
$^b$Reactor #4 plugged Table 2 shows that at all HRT's the combination of foam having entrapped carbon and microorganisms afforded significantly lower phenol effluent levels than the other fixed bed reactors (#1 and #2), especially in achieving phenol effluent levels of 20 ppb and under. The data in Table 3 show that sludge formation, as measured by suspended solids from our PBSS-packed reactors, was substantially less than that from prior art reactor #1, with reductions ranging from 32 to 76 percent. This comparison becomes even more favorable when it is realized that reactor #3 simultaneously produces lower sludge formation and lower phenol effluent levels than does reactor #1.

TABLE 4

Effluent Phenol Levels from Immobilized Cell Reactors

| | | EFFLUENT PHENOL CONCENTRATION (μg/L) | | | |
|---|---|---|---|---|---|
| DAYS | LHSV, hr$^{-1}$ | Reactor #1 | Reactor #2 | Reactor #3 | Reactor #4 |
| 6 | 0.03 | 101 | 100 | 82 | — |
| 7 | " | 137 | 171 | 44 | 45 |
| 11 | " | 77 | 73 | 30 | 27 |
| 12 | " | 70 | 58 | 22 | 24 |
| 13 | " | 47 | 47 | 25 | 29 |
| 14 | " | 59 | 68 | 25 | 32 |
| 22 | " | 32 | 41 | 15 | 16 |
| 25 | " | 61 | 44 | 20 | 27 |
| 29 | 0.06 | 43 | 36 | 13 | 19 |
| 33 | " | 47 | 47 | 24 | 22 |
| 50 | " | 58 | 58 | 26 | 23 |
| 55 | " | 48 | 50 | 22 | 22 |
| 58 | " | 40 | 46 | 21 | 23 |
| 62 | " | 30 | 38 | 15 | 18 |
| 65 | " | 47 | 49 | 29 | 28 |
| 68 | " | 32 | 36 | 12 | ** |
| 75 | 0.09 | 35 | 30 | 13 | ** |
| 79 | " | 21 | 28 | 12 | ** |
| 83 | " | 64 | 34 | 17 | ** |
| 85 | " | 33 | 38 | 24 | ** |
| 88 | " | 45 | 34 | 23 | ** |
| 99 | 0.12 | 27 | 26 | 16 | ** |
| 103 | " | 27 | 24 | 17 | ** |
| 106 | " | 27 | 25 | 5 | ** |
| 116 | " | 12 | 19 | 11 | ** |

**Reactor #4 plugged

The foregoing data show that there is no significant difference between performance of the naturally immobilized cell reactor (i.e., where the cells are attached on the polypropylene surface) and cells immobilized in polyurethane foam as regards effluent phenol levels, nevertheless there is lower sludge formation, as measured by lower suspended solids in the effluent, from the foam immobilized reactor compared to the biofilm reactor. However, the presence of activated carbon appears to have a significant and dramatic effect upon the level of phenol present in the reactor effluent, permitting phenol levels at or below 20 ppb.

EXAMPLE III

Pilot Plant Operation.

A scaled up version of reactors 3 and 4 of the foregoing example was used to process a slip stream of industrial wastewater at a coal tar processing plant. The reactor was 14 feet high with an inside diameter of 12.4 inches. Foam prepared as above but containing approximately 33 weight percent powdered activated carbon was cut into cubes approximately 1 inch per side and was used to pack the reactor to a foam height of 11 feet, giving a foam volume of 65 gallons and a void volume of 22 gallons. Waste water entered at the bottom of the reactor along with air passed through a sparging tube. After an extensive shakedown period during which the effect of various independent variables upon system operating performance was evaluated, the unit was operated at what was determined to be its optimum point for phenol removal from the feedstock. This corresponded to a feed flow rate of 0.1 gallon per minute, or HRT of 15 hours, and an air flow of 1.15 SFCM.

The pilot plant was operated concurrently with a Leopold Upflow Bio-Tower from Sybron Inc. which processed the industrial waste water from which the slip stream to the pilot plant was drawn. The Bio-Tower was operated under conditions determined to be its optimum for phenol removal, which included an HRT of about 15 hours. This concurrent operation permitted a comparison of operational characteristics between the two units, some of which are summarized in the following tables.

The standard analytical test method for phenols using 4-aminoantipyrine (4-AAP) does not discriminate among individual phenolic components and also has been found to be subject to interference by many non-phenolic materials, such as aromatic hydrocarbons. In contrast, gas chromatographic analysis using a mass selective detector is both more sensitive and discriminatory than the 4-AAP method, affording more reliable data.

TABLE 5

GC/MSD Analysis of Phenolics in Wastewater Feed and in Bio-Tower and Pilot Plant Effluents[a]

| Sample No. | Component | Concentration (μg/L) Wastewater | ICB Pilot Plant | Sybron Bio-Tower |
|---|---|---|---|---|
| 1 | phenol | 393,000 | 14 | 11 |
|   | o-cresol | 40,000 | 31 | 8 |
|   | m,p-cresol | 62,000 | 7 | 28 |
|   | 2,4-dimethyl phenol | 6,000 | 9 | 36 |
|   | Phenolics by 4-AAP[b] | 800,000 | 1,100 | 1,500 |
| 2 | phenol | 541,000 | 28 | 25 |
|   | o-cresol | 42,000 | 31 | 201 |
|   | m,p-cresol | 70,000 | 10 | 996 |
|   | 2,4-dimethyl phenol | 5,800 | 11 | 241 |
|   | Phenolics by 4-AAP | 950,000 | 900 | 4,400 |
| 3 | phenol | 1,408,333 | 12 | 3,907 |
|   | 2,4 dimethyl phenol | 17,545 | 96 | 37 |
|   | TSS (mg/L) | 59 | 208 | 1113 |
| 4 | phenol | 339,024 | 6 | 801 |
|   | 2,4-dimethyl phenol | 2,665 | 9 | 208 |
|   | TSS (mg/L) | 55 | 189 | 760 |

[a]GC/MSD stands for gas chromatographic analysis with mass selective detector.
[b]4-Aminoantipyrine analysis.

Table 6 summarizes analytical results from a commercial environmental laboratory.

TABLE 6

Analytical Results from Independent Laboratory[a]

| Pollutants | Feed[b] | Pilot Plant[b] Effluent | Bio-Tower[b] Effluent |
|---|---|---|---|
| 2,4-DIMETHYLPHENOL | 880 | <100 | 130 |
| PHENOL | 240000 | <100 | <100 |
| ACENAPHTHENE | 620 | <100 | 340 |
| ACENAPHTHLENE | 122 | 420 | <100 |
| FLUORANTHENE | 130 | <100 | <100 |
| NAPHTHALENE | 5000 | <100 | 260 |
| PHENANTHRENE | 350 | <100 | <100 |
|  | <400 | <100 | <100 |

[a]Kemron Environmental Services, (109 Starlite Park, Marietta, Ohio 45715)
[b]All units are micrograms per liter (μg/L). Detection Limits are: feed = 400; effluent = 100.

The foregoing data show that the method which is our invention is at least as efficient as a current commercial process, and is in fact even more efficient in removal of some non-regulated phenolic materials such as the cresols and, especially, 2,4-dimethylphenol. In particular, it appears to more consistently reduce total phenolic content than does the commericial comparison process, and reduces them to a level under that achieved by the comparison process. In addition, the ICB produced less than 25% of the sludge produced by the comparison process.

The waste water also contained aromatic hydrocarbons as pollutants, and Table 7 shows that our method is as efficient as the commercial comparison process in the removal of these materials as well.

TABLE 7

Purge and Trap GC/FID Analysis of Benzene and Toluene.[a]

| | Concentration (mass-ppb) | | | | | |
|---|---|---|---|---|---|---|
| | Influent Wastewater | | Pilot Plant Effluent | | Bio-Tower Effluent | |
| Run | Benzene | Toluene | Benzene | Toluene | Benzene | Toluene |
| 1 | 3,800 | 2,400 | 25 | 10 | 35 | 10 |
| 2 | 6,200 | 4,100 | 35 | 14 | 26 | 8 |
| 3 | 4,800 | 1,600 | 12 | 6 | — | — |

[a]GC/FID stands for gas chromatograph with flame ionization detector.

EXAMPLE IV

Laboratory Performance with Industrial Waste Water.

A glass reactor as described in Example II used as a fixed bed the porous biomass system of Example I containing 33 weight percent powdered activated carbon. The microorganisms entrapped in the biofoam were enrichment cultures from the wastewater and soil at the site prepared as described in Example I. The reactors (ICB) were operated at a hydraulic retention time of 24 hours using a sample of industrial waste water from a phenol production plant. For comparison, effluent of the same waste water treated with activated sludge for 120 hours is also shown. Table 8 shows that both benzene and phenol are degraded almost completely immediately upon operation of the unit. A second trial afforded similar results. Table 9 shows the effect of hydraulic retention time on phenol breakthrough, and shows similar phenol degradation at hydraulic retention times as low as about 8 hours. As previously noted the phenolic assay by 4-aminoantipyrine is subject to interference by a myriad of substances, including aromatic hydrocarbons, which are likely to be found in the waste waters. Therefore the results of the analysis in this table are to be used solely to indicate a trend rather than for absolute purposes. In contrast, Table 10 affords an analytical result as obtained via GC/MSD analysis in which the effect of interfering substances has been removed and which gives much more reliable analysis than the 4-AAP method. Among other things, Table 10 shows the enormous reduction in sludge production by the method of this invention relative to that of a typical retention basin. Finally, Table 11 shows more complete analytical data for effluent, from which it can be concluded that our reactor affords more complete degradation of most organic pollutants in 24 hours than does activated sludge in a retention basin in 120 hours.

TABLE 8

Immobilized Whole Cell Reactor Treatment of an Industrial Waste VT-633. Additional Phenol and Benzene Added.

| Time (hours)[d] | 23.8 | 30.3 | 47.3 |
|---|---|---|---|
| Influent Benzene Conc. (ppb) | 2644.0 | 3200.0 | 920.0 |
| Incremental Total Benzene Loaded (μg) | 621.3 | 294.4 | 220.8 |
| Incremental Total Effluent Benzene (μg)[b] | <0.5 | <0.2 | <0.5 |
| Total Trapped Benzene in air (μg) | 3.0 | 0.8 | 1.7 |
| % Benzene Degraded | >99.4 | >99.7 | >99.0 |
| Influent Phenolics Conc. (ppm)[a] | 141.6 | 144.8 | 135.3 |
| Effluent Phenol Conc. (ppm)[b] | bmdl[c] | bmdl[c] | bmdl[c] |

TABLE 8-continued

Immobilized Whole Cell Reactor Treatment of an Industrial Waste VT-633. Additional Phenol and Benzene Added.

| Time (hours)[d] | 23.8 | 30.3 | 47.3 |
|---|---|---|---|
| % Phenol Degraded | >99.5 | >99.5 | >99.5 |

[a]Total Phenolics by 4-AAP assay.
[b]Minimum detection limits: phenol .2 ppm by 4-AAP assay; benzene, 2 parts per billion by purge and trap gas chromatography with flame ionization detector.
[c]bmdl = below minimum detection limit.
[d]Time from startup.

TABLE 9

Immobilized Whole Cell Reactor Treatment of an Industrial Waste VT-633.

| Accumulative Time (hrs): | 26.25 | 52.25 | 77.25 | 105.25 | 123.75 | 150.08 | 173.08 | 198.08 | 224.08 |
|---|---|---|---|---|---|---|---|---|---|
| Lapsed Time (hrs): | 26.25 | 26.00 | 25.00 | 28.00 | 18.50 | 26.33 | 23.00 | 25.00 | 26.00 |
| HRT (hr/col): | 23.3 | 25.4 | 23.3 | 11.0 | 11.0 | 10.6 | 8.7 | 8.6 | 7.2 |
| Influent Total Phenolics Conc. (ppm): | 66.7 | 43.0 | 45.9 | 45.7 | 45.2 | 45.5 | 45.7 | 50.6 | 54.7 |
| Effluent Phenol Conc. (ppm): | 2.0 | 3.5 | 3.7 | 3.6 | 4.0 | 3.8 | 3.6 | 3.7 | 6.3 |
| % Phenol Degraded: | 97.0 | 91.9 | 91.9 | 92.1 | 91.2 | 91.6 | 92.1 | 92.7 | 88.5 |

TABLE 10

Analysis of Untreated, ICB Treated and Activated Sludge Treated Wastewater

| | Concentration (ppb) | | |
|---|---|---|---|
| Component | Untreated | ICB | Activated Sludge |
| Acetone | 1,350,000 | 100,000 | 850,000 |
| Phenol | 35,000 | 10 | 10 |
| Benzene | 350 | 20 | 20 |

ICB - 24 hr retention time - 0.58 mg. sludge/liter effluent
Activated Sludge - 120 hr retention time - 1.75 mg sludge/liter effluent

TABLE 11

| | Water Analyses Results, ppb | |
|---|---|---|
| Compound | ICB Reactor | Active Sludge |
| Acetone | 100,000 | 850,000 |
| Benzene | 20 | 20 |
| Butanone | <10 | 200 |
| Pentanone | <10 | 300 |
| Chloroform | 300 | 200 |
| Epoxy ketone | 600 | 3000 |
| Diacetone alcohol | 350 | 1700 |
| C9 ketone? | 2000 | 4000 |
| Methyl cyclohexenone | 700 | 3500 |
| Dimethyl phenyl carbinol | 60,000 | 200,000 |
| Acetophenone | <10 | 10,000 |
| Acetyl cyclohexanone | 300 | 3500 |
| Unknown M.W. 126 | 100 | 75 |
| Phenol | 10 | 10 |

EXAMPLE V

Comparison of Reactor Configuration on Sludge Production.

A model phenol wastewater feed (described in Example II) was treated in three bench scale reactors. Two were 500 ml New Brunswick glass fermenters that were continuously mixed with a mechanical stirrer. One of these fermentors was operated as a chemostat in which the wastewater was pumped through with a hydraulic retention time of 33 hrs. In this reactor growth of the bacteria is required to replace the bacteria washed from the reactor in the effluent. A second mixed reactor was filled with approximately 200 ml of biofoam and operated similarly. The third reactor consisted of a 500 ml ICB bench scale reactor, as described in Example II, using as a fixed bed the same biofoam as used in the foregoing second mixed reactor. This reactor was operated with a hydraulic retention time of 12.5 hours. The ICB reactor produced both lower sludge and better phenol removal efficiency than either of the mixed reactors, as shown in Table 12.

TABLE 12

Sludge Formation in Various Reactors

| Reactor | HRT (hrs) | Effluent Phenol[c] (µg/L) | Sludge[c] OD 600 nm[a] | TSS (mg/L)[b] |
|---|---|---|---|---|
| Continuous Stirred Tank Reactor (CSTR) | 33 | 820 | 0.45 | 680 |
| CSTR + Biofoam | 33 | 62 | 0.36 | 606 |
| ICB | 13 | 19 | 0.07 | 96 |

[a]Sludge as measured by turbidity; optional density at 600 nm.
[b]Total suspended solids.
[c]Measurements taken after 1 void volume for the CSTR reactors, and after 33 hours for the ICB. None represent steady state conditions.

These data clearly and unambiguously show a substantial, quite significant reduction in sludge production using our biofoam in a fixed bed reactor.

What is claimed is:

1. A method for the aerobic biodegradation of phenolic materials in aqueous streams to levels under about 0.1 parts per million in a period no more than about 30 hours comprising flowing at a rate corresponding to an hydraulic residence time no more than about 30 hours an aqueous stream containing phenolic materials in the presence of oxygen through a fixed mass of a porous biomass support system of particulate open-celled polyurethane foam having entrapped within its pores powdered activated carbon and aerobic phenolic-degrading microorganisms.

2. The method of claim 1 where the phenolic materials are selected from the group consisting of phenols, cresols, catechols, resorcinol, nitrophenols, halogenated phenols, and 2,4-dimethylphenol.

3. The method of claim 1 where the porous biomass support system contains at least 5 and up to about 85 weight percent of powdered activated carbon on a dry basis at the time of preparation.

4. The method of claim 3 where the porous biomass support system contains at least about 10 weight percent activated carbon.

5. The method of claim 3 where the porous biomass support system contains between about 20 and about 40 weight percent activated carbon.

6. The method of claim 1 where at least 70% of the particles of activated carbon are smaller than about 44 microns, and where the carbon has a surface area of at least 500 m²/g with a pore volume of at least 0.7 cc/g.

7. The method of claim 1 where the phenol is reduced to under 0.1 parts per million at an hydraulic residence time of under about 24 hours.

8. The method of claim 7 where the hydraulic residence time is no more than about 15 hours.

9. The method of claim 7 where phenol is reduced to less than 20 parts per billion at a hydraulic residence time of less than 24 hours.

10. The method of claim 9 where the hydraulic residence time is no more than about 15 hours.

11. A method for the aerobic biodegradation of organic pollutants in aqueous streams comprising flowing at a rate corresponding to an hydraulic residence time no more than about 30 hours a pollutant-laden aqueous stream in the presence of oxygen through a fixed mass of a porous biomass support system of particulate open-celled foam having entrapped within its pores powdered activated carbon and aerobic microorganisms capable of degrading said organic pollutants and with a total sludge production no more than about 100 kg dry weight sludge per metric ton chemical oxygen demand consumed.

12. The method of claim 11 where the pollutants are selected from the group consisting of phenolic materials, aromatic hydrocarbons, and polynuclear aromatic hydrocarbons.

13. The method of claim 11 where the porous biomass support system contains at least 5 and up to about 85 weight percent of powdered activated carbon on a dry basis at the time of preparation.

14. The method of claim 13 where the porous biomass support system contains at least about 10 weight percent activated carbon.

15. The method of claim 13 where the porous biomass support system contains between about 20 and about 40 weight percent activated carbon.

16. The method of claim 11 where at least 70% of the particles of activated carbon are smaller than about 44 microns, and where the carbon has a surface area of at least 500 $m^2/g$ with a pore volume of at least 0.7 cc/g.

17. The method of claim 11 where the foam is a polyurethane foam.

18. A method for the aerobic biodegradation of phenolic materials in aqueous streams to levels under about 0.1 parts per million in a period no more than about 30 hours consisting essentially of flowing at a rate corresponding to a hydraulic residence time no more than about 30 hours an aqueous stream containing phenolic materials in the presence of oxygen through a fixed mass of a porous biomass support system of particulate open-celled polyurethane foam having entrapped within its pores powdered activated carbon and aerobic phenolic-degrading microorganisms.

19. A method for the aerobic biodegradation of organic pollutants in aqueous streams consisting essentially of flowing at a rate corresponding to a hydraulic residence time no more than about 30 hours a pollutant-laden aqueous stream in the presence of oxygen through a fixed mass of a porous biomass support system of particulate open-celled foam having entrapped within its pores powdered activated carbon and aerobic microorganisms capable of degrading said organic pollutants and with a total sludge production no more than about 100 kg dry weight sludge per matrix ton chemical oxygen demand consumed.

20. The method of claim 19 wherein the pollutants are selected from the group consisting of phenolic materials, aromatic hydrocarbons, and polynuclear aromatic hydrocarbons.

* * * * *